(12) United States Patent
El-Oulhani et al.

(10) Patent No.: US 11,472,225 B2
(45) Date of Patent: Oct. 18, 2022

(54) MOUNTING WHEEL FOR MOTOR VEHICLE AND MOUNTED ASSEMBLY COMPRISING SUCH A MOUNTING WHEEL

(71) Applicant: COMPAGNIE GENERALE DES ETABLISSEMENTS MICHELIN, Clermont-Ferrand (FR)

(72) Inventors: Mostapha El-Oulhani, Clermont-Ferrand (FR); Olivier Muhlhoff, Clermont-Ferrand (FR)

(73) Assignee: COMPAGNIE GENERAL DES ESTABLISSEMENT, Clermont-Ferrand (FR)

( * ) Notice: Subject to any disclaimer, the term of this patent is extended or adjusted under 35 U.S.C. 154(b) by 216 days.

(21) Appl. No.: 16/619,734

(22) PCT Filed: Jun. 7, 2018

(86) PCT No.: PCT/HR2018/051332
§ 371 (c)(1),
(2) Date: Dec. 5, 2019

(87) PCT Pub. No.: WO2018/224787
PCT Pub. Date: Dec. 13, 2018

(65) Prior Publication Data
US 2020/0139755 A1  May 7, 2020

(30) Foreign Application Priority Data
Jun. 9, 2017 (FR) ..................... 17/55147

(51) Int. Cl.
*B60B 3/16* (2006.01)
*B60B 3/00* (2006.01)
(Continued)

(52) U.S. Cl.
CPC ............... *B60B 3/16* (2013.01); *B60B 3/008* (2013.01); *B60B 5/02* (2013.01); *B60C 7/10* (2013.01); *B60C 7/107* (2021.08)

(58) Field of Classification Search
CPC .. B60B 3/16; B60B 3/008; B60B 5/02; B60B 9/10; B60C 7/10; B60C 7/107; B60C 2007/107
See application file for complete search history.

(56) References Cited

U.S. PATENT DOCUMENTS 5,601,343 A    2/1997  Hoffken
2003/0159894 A1*  8/2003  Novak .................... F16D 65/12
188/72.1

(Continued)

FOREIGN PATENT DOCUMENTS

DE     199 57 255       6/2001
EP        0297103 B1 *  7/1991  ............... B60C 7/12
(Continued)

Primary Examiner — S. Joseph Morano
Assistant Examiner — Emily G. Castonguay
(74) Attorney, Agent, or Firm — Cozen O'Connor

(57) ABSTRACT

A mounting wheel (3) for a motor vehicle comprising an internal surface (2) and an external surface (4), the internal surface (2) not being visible when the mounting wheel (3) is mounted on the motor vehicle, and at least one fixing element (7) configured to attach the mounting wheel (3) to the motor vehicle. The fixing element (7) is arranged on the internal surface (2) of the mounting wheel (3) so that the fixing element (7) is not visible when the mounting wheel (3) is mounted on the motor vehicle.

19 Claims, 5 Drawing Sheets

(51) Int. Cl.
*B60B 5/02* (2006.01)
*B60C 7/10* (2006.01)

(56) References Cited

U.S. PATENT DOCUMENTS

| | | | |
|---|---|---|---|
| 2004/0251735 A1* | 12/2004 | Baumgartner | B60B 21/028 |
| | | | 301/63.103 |
| 2014/0000777 A1 | 1/2014 | Choi | |
| 2014/0062169 A1* | 3/2014 | Martin | B60C 7/14 |
| | | | 301/62 |
| 2016/0147973 A1 | 5/2016 | Holcomb | |

FOREIGN PATENT DOCUMENTS

| | | | | |
|---|---|---|---|---|
| JP | 2009 035051 | | 2/2009 | |
| KR | 20160107448 A | * | 9/2016 | B60C 7/10 |
| WO | WO 2004/028832 | | 4/2004 | |
| WO | WO 2008/009042 | | 1/2008 | |
| WO | WO 2015/104213 | | 7/2015 | |

* cited by examiner

MOUNTING WHEEL FOR MOTOR VEHICLE AND MOUNTED ASSEMBLY COMPRISING SUCH A MOUNTING WHEEL

RELATED APPLICATIONS

This is a U.S. National Phase Application under 35 USC 371 of International Application PCT/FR2018/051332 filed on Jun. 7, 2018.

This application claims the priority of French application no. 17/55147 filed Jun. 9, 2017, the entire content of which is hereby incorporated by reference.

TECHNICAL FIELD OF THE INVENTION

The present invention relates to a mounting wheel for a motor vehicle and, more specifically, to such a mounting wheel that has an improved appearance.

TECHNICAL BACKGROUND OF THE INVENTION

An increasing level of consideration is being given nowadays to the aesthetic look and purely ornamental appearance when designing a pneumatic tire to be mounted on a mounting wheel for motor vehicles. The designers of the said assemblies are sometimes driven to create decorative patterns which occupy both the exterior surface of the tire (more specifically on the sidewall part which extends between the tread and that part of the tire that is in contact with the wheel) and on the exterior surface of the trim fitted to the mounting wheel on which the tire is mounted.

In this context, it may be highly advantageous from a decorative standpoint to create a pattern which exhibits overall unity both on the visible surface of the trim and on the visible external surface of the tire. What is meant by a pattern that exhibits overall unity is a pattern which exhibits no apparent visual discontinuity between the surface of a decorated sidewall and the visible surface of the trim situated on the same side as the decorated sidewall.

In the case of a pattern that exhibits overall unity, a first problem arises, after the tire has been mounted on its mounting rim, at the time of fitting the trim. Specifically, it is sometimes tricky to position the trim correctly with respect to the pattern on the tire so as to establish a pattern without discontinuity between that part of the said pattern that is present on the sidewall and that part that is present on the trim. This is all the more true when the said pattern does not necessarily repeat in the circumferential direction so that it is then absolutely essential to align the said two parts perfectly in order to establish the desired decorative pattern.

SUMMARY OF THE INVENTION

It is an object of the invention to overcome these disadvantages by providing a mounting wheel of a mounted assembly in which the visible surface has a uniform appearance and allowing far greater aesthetic freedom.

To this end, one aspect of the invention relates to a mounting rim for a motor vehicle comprising an internal surface and an external surface, the internal surface not being visible when the mounting rim is mounted on the motor vehicle, and at least one fixing element configured to attach the mounting wheel to the motor vehicle, characterized in that the fixing element is arranged on the internal surface of the mounting wheel in such a way as to leave the external surface of the mounting wheel free of any fixing element so that the fixing element is not visible when the mounting wheel is mounted on the motor vehicle.

Advantageously according to an embodiment of the invention, the external surface of the mounting wheel is free of any fixing element or trim intended to conceal any fixing of the mounted assembly. The external surface of the mounting wheel can thus be manufactured with an even profile, without discontinuities notably in the centre of the mounting wheel, or even, as explained hereinbelow, from the centre of the mounting wheel to the tread. Such an even profile may thus be an aerodynamically advantageous, completely flat surface with no additional component.

In addition, the mounting wheel becomes more difficult to steal when mounted on a motor vehicle. This is because its removal requires access from the internal surface, which will dissuade a thief from attempting to remove it.

Finally, the space freed up in the centre may allow the incorporation of elements that could not previously be mounted because of the presence of the fixing elements, such as a contactless signal transmission circuit, a microprocessor or even lighting elements.

According to other optional features of the invention:
which the fixing element comprises one part of at least one fixing of the fixing hole-fixing shank type;
the fixing hole is a bore or a nut and the fixing shank is an at least partially threaded screw or stud;
the fixing hole is formed on the internal surface of the mounting wheel;
the fixing shank is formed on the internal surface of the mounting wheel;
the mounting wheel comprises between 3 and 9 fixing elements;
the fixing elements are uniformly distributed about an axis of rotation of the mounting wheel.

Another aspect of the invention relates to a mounted assembly comprising a tread configured to allow the mounted assembly to roll along a roadway, characterized in that it comprises a mounting wheel as set out hereinabove.

According to other optional features of the invention:
the tread is secured to the mounting wheel by an intermediate mass;
the intermediate mass comprises at least a part made from a material comprising a plurality of cavities;
the intermediate mass and the mounting wheel are formed together in the same material and comprise at least a part made from a material comprising a plurality of cavities;
the material comprising a plurality of cavities has more cavities near the tread than near the centre of the mounting wheel;
the part made in a material comprising a plurality of cavities forms a three-dimensional structure comprising a plurality of beams;
the beams are oriented in such a way as to form a lattice;
the lattice forms a structure of the Voronoi diagram type with Delaunay triangulation;
the material comprising a plurality of cavities is made of polyurethane or of rubber.

Finally, the invention relates to a motor vehicle comprising a suspension system, characterized in that it comprises a mounted assembly as set out hereinabove, the fixing element of which is attached to the suspension system.

BRIEF DESCRIPTION OF THE DRAWINGS

Further particular features and advantages will become clearly apparent from the following description, which is given by way of non-limiting example, with reference to the appended drawings, in which.

DETAILED DESCRIPTION OF AT LEAST ONE EMBODIMENT OF THE INVENTION

Figure 1:
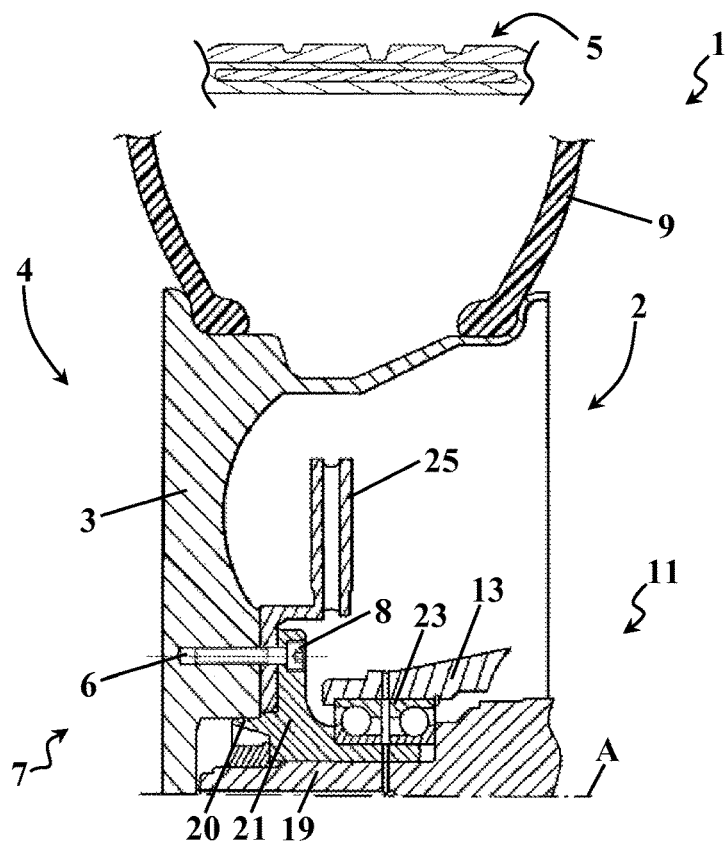
FIG. 1 is a view in cross section of a first embodiment of a mounted assembly connected to a motor vehicle suspension system according to a first variant form of the invention.

In the various figures, identical or similar elements bear the same references. Therefore, the description of their structure and their function is not systematically repeated.

In all that follows, the orientations are the usual orientations of a motor vehicle. In particular, the terms "upper", "lower", "left", "right", "above", "below", "forwards" and "backwards" are generally understood to mean with respect to the normal direction in which the motor vehicle runs and to the position of the driver.

A "pneumatic tire" means all types of resilient tire subjected to an internal pressure.

A "rubbery material" means a diene elastomer, that is to say, in a known way, an elastomer which is based, at least partially (i.e. is a homopolymer or a copolymer of), on diene monomers (monomers bearing two conjugated or non-conjugated carbon-carbon double bonds).

A "tread" means a quantity of rubbery material delimited by lateral surfaces and by two main surfaces, one of which, referred to as the tread surface, is intended to come into contact with a road surface when the tire is being driven on.

The invention relates to a mounted assembly 1 intended to be connected to a motor vehicle and, more specifically, mounted with the ability to rotate about the axis A with respect to a suspension system 11 of such a motor vehicle. It will therefore be appreciated that a motor vehicle having four treads 5 will comprise four mounted assemblies 1.

The mounted assembly 1 comprises a mounting wheel 3 comprising an internal surface 2 and an external surface 4. The internal surface 2 is intended to face in towards the motor vehicle in the region of the suspension system 11 thereof. It will therefore be appreciated that, once mounted on the motor vehicle, the mounting wheel 3 is chiefly visible only via its external surface 4. The mounted assembly 1 further comprises a tread 5 configured to allow the mounting assembly 1 to run along a roadway.

The mounting wheel 3 comprises at least one fixing element 7 configured to attach the mounting wheel 3 to the motor vehicle. Advantageously according to the invention, each fixing element 7 is arranged on the internal surface 2 of the mounting wheel 3 so that only the external surface 4 is visible when the mounted assembly 1 is assembled on the motor vehicle, namely notably so that each fixing element 7 is completely hidden. It will notably be understood that, for preference, the external surface 4 does not communicate with the internal surface 2 in the region of the centre of the mounting wheel 3, namely that the external surface 4 is solid at the centre of the mounting wheel 3, as illustrated in FIGS. 1-3, 5-7 and 9-10.

The fixing element 7 may be of various kinds. However, for preference, the fixing element 7 comprises one part of at least one fixing of the fixing hole 6-fixing shank 8 type, which is simple and robust. More specifically, the fixing hole 6 may be a bore or a nut and the fixing shank 8 may be a threaded stud or screw.

Of course, the mounting direction of each fixing element 7 may, without any inferred preference, be parallel to the axis of rotation A of the mounting wheel 3, perpendicular thereto, or at an angle thereto. In addition, each mounting wheel 3 may comprise between 3 and 9 fixing elements according to its configuration, and these may be distributed symmetrically or otherwise on the internal surface 2 of the mounting wheel 3. By way of entirely nonlimiting example, the fixing elements 7 may thus be uniformly distributed about the axis of rotation A of the mounting wheel 3.

According to a first embodiment visible in FIGS. 1 to 3 and 5 to 8, the fixing element 7 forms a fixing hole 6 formed on the internal surface 2 of the mounting wheel 3. More specifically, the fixing hole 6 forms a bore intended to accept a fixing shank 8 such as a screw.

As visible in FIG. 1, a first variant form of the first embodiment of the mounted assembly 1 comprises a tread 5 which is secured to the mounting wheel 3 by a conventional pneumatic tire 9 made of rubbery material. It will therefore be appreciated that the mounting wheel 3, made for example of a metal alloy such as aluminium, in this first variant form forms a wheel rim. The mounting wheel 3 comprises fixing holes 6 uniformly distributed about an axis of rotation A on its internal surface 2.

Figure 4:
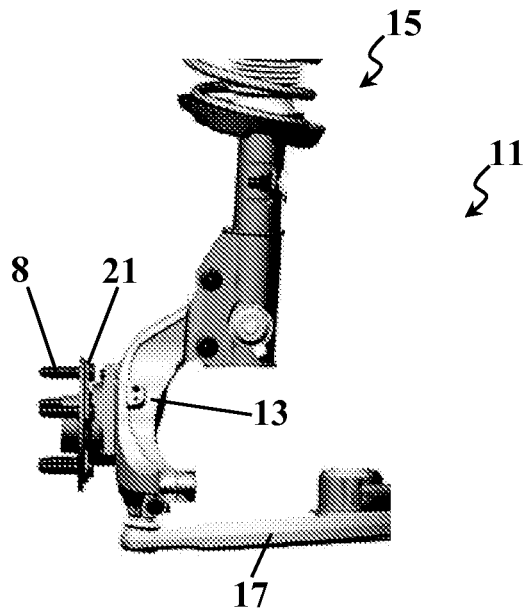
FIG. 4 is a schematic partial view of an example of a motor vehicle suspension system.
Figure 5:
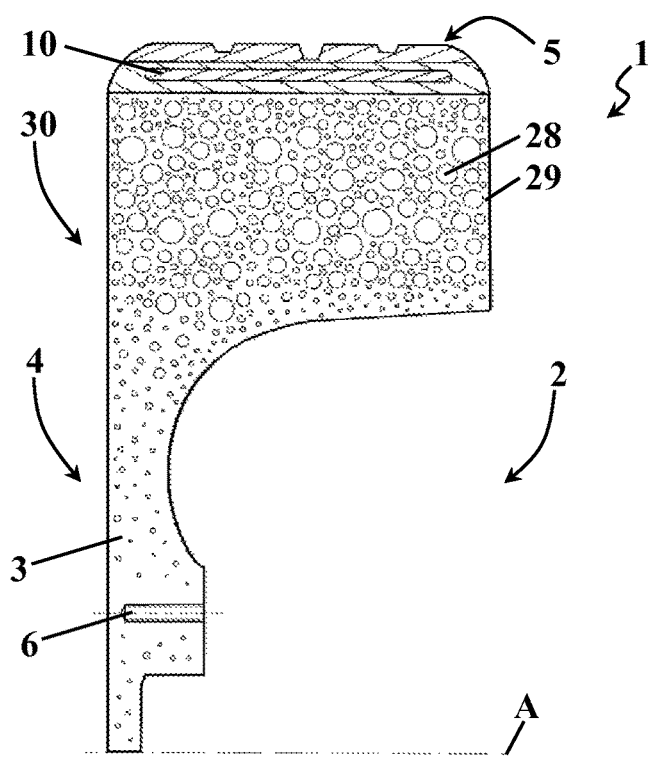
FIG. 5 is a view in cross section of the first embodiment of a mounting wheel according to the third variant form of the invention.
Figure 6:
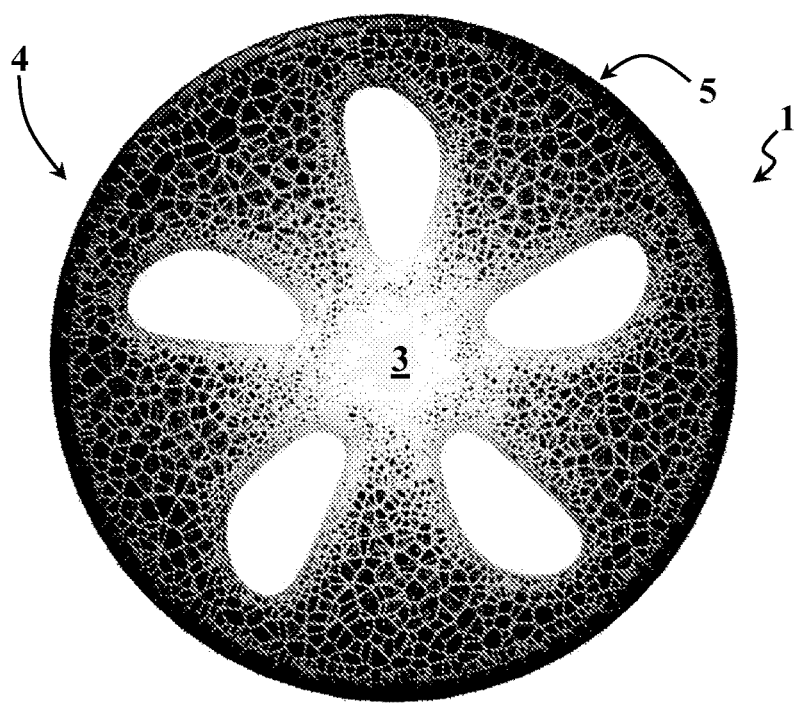
FIG. 6 is a perspective view of the external surface of the first embodiment of the mounted assembly according to the third variant form of the invention.
Figure 7:
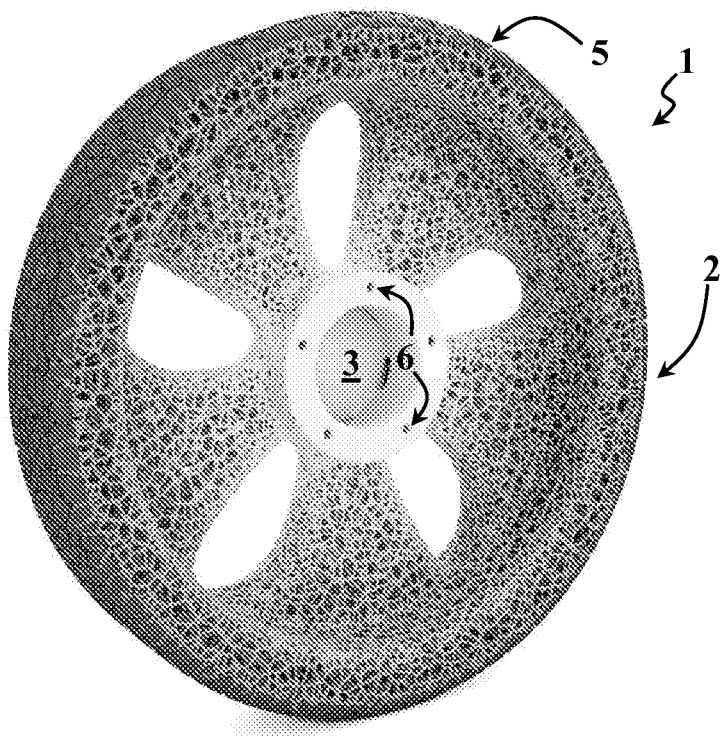
FIG. 7 is a perspective view of the internal surface of the first embodiment of the mounted assembly according to the third variant form of the invention.
Figure 8:
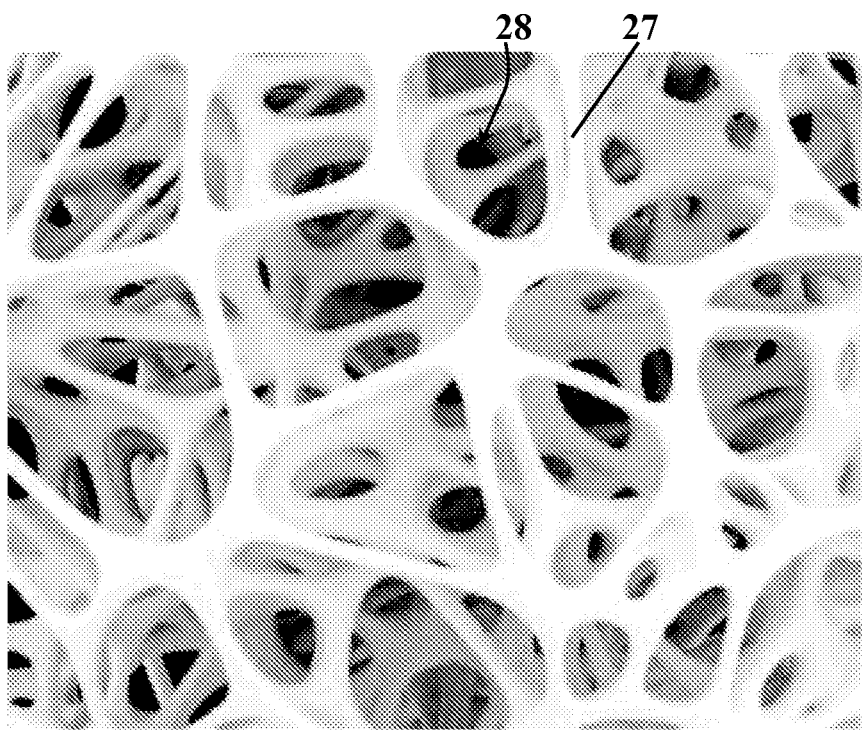
FIG. 8 is an enlarged perspective view of FIG. 6.

As visible in FIG. 4, one example of a suspension system 11 intended to accept the mounted assembly 1 is shown. The suspension device 11 comprises a stub axle carrier 13 that forms the connection between the chassis of the motor vehicle and the mounted assembly 1. The stub axle carrier 13 is secured, in its upper part, to an assembly 15 comprising a suspension spring and a damper and, in its lower part, to a suspension arm 17.

In FIG. 1, it can be seen that the stub axle carrier 13 also houses, in its open central part, a stub axle 19 intended to transmit movement to the mounted assembly 1. More specifically, the relative movement between the stub axle 19 and the stub axle carrier 13 is rendered possible by the fact that the stub axle 19 is housed in a hub 21 mounted in the stub axle carrier 13 via rolling bearings 23.

In the setup visible in FIG. 1, it will be appreciated that the suspension system 11 is fitted with the stub axle 19, with the hub 21 and with a braking device 25 (represented as a brake disc in FIG. 1) beforehand. The mounted assembly 1 is then fitted onto the flange 20 of the hub 21 then fixed by collaboration between the fixing holes 6 and the fixing shanks 8.

More specifically, the mounted assembly 1 is offered up to the hub 21 by an operator positioned on the side of the internal surface 2 of the mounting wheel 3. The operator positions the mounted assembly 1 in such a way that the fixing holes 6 face the fixing shanks 8, then tightens the fixing shanks 8 until each of the heads of the fixing shanks 8 is immobilized against the hub 21. Each fixing shank 8 therefore secures the suspension system 11 to the mounted assembly 1 only via mounting from the internal surface 2 of the mounting wheel 3.

Advantageously according to the invention, the mounting wheel 3 thus comprises an external surface 4 which is free of any fixing element, or trim intended to hide these fixing elements. The external surface 4 may thus be manufactured with an even profile, with no discontinuities in the region of the mounting wheel 3. Such an even profile may thus be a completely flat surface which is particularly advantageous from an aerodynamic standpoint, without the addition of additional components. It will be notably appreciated that the external surface 4 may be solid in the region of the centre of the mounting wheel 3, as illustrated in FIG. 1.

As a result, in addition to affording an external surface 4 which is free of any fixing element or trim, the mounted assembly 1 is also difficult to steal when mounted on a motor vehicle.

This is because changing each mounted assembly 1 requires access from the internal surface 2, and this will dissuade a thief from attempting to remove them. In the example of FIG. 1, the configuration of the stub axle carrier 13 allows access to the fixing shank 8 in order to remove the mounted assembly 1. The mounted assembly 1 needs merely to be turned in order to access each fixing shank 8.

This first variant form is suited to electric vehicles which might thus be able to have motors mounted on the internal surface 2 of the mounted assemblies 1, in place of the stub axle 19.

Finally, the space freed up in the centre, namely in the solid part of the external surface 4, may allow the incorporation of elements that could not be mounted because of the presence of the fixing elements 7. By way of entirely nonlimiting example, the centre of the mounting wheel 3 could thus incorporate elements allowing reinstallation of the pneumatic tire 9, a contactless signal transmission circuit, a microprocessor or even lighting elements.

Figure 2:
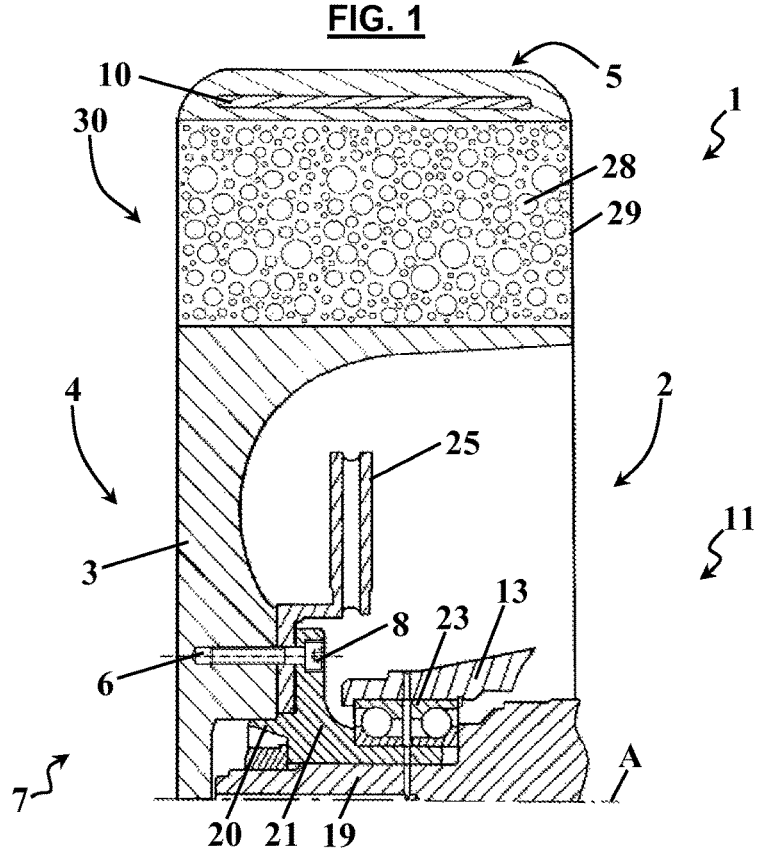
FIG. 2 is a view in cross section of the first embodiment of a mounted assembly connected to a motor vehicle suspension system according to a second variant form of the invention.

As visible in FIG. 2, a second variant form of the first embodiment comprises a tread 5 which is secured to the mounting wheel 3 by an intermediate mass 29 made of polyurethane or of rubber, forming a mounted assembly 1 of composite type. As visible in FIG. 2, the tread 5 may comprise a reinforcer 10 (for example a reinforcing ply) making it possible to ensure good mechanical integrity and/or good stiffness near the contact patch in which it is in contact with the roadway. The mounting wheel 3, for example made of metal alloys, such as of aluminium, comprises fixing holes 6 uniformly distributed about an axis of rotation A on its internal surface 2.

As can be seen in FIG. 2, the intermediate mass 29 comprises at least a part comprising a plurality of cavities 28. For preference in this second variant form, the cavities 28 are trapped within the intermediate mass 29 and inter-communicate little, if at all. The intermediate mass 29 thus makes it possible to afford elasticity and mechanical strength comparable with the pneumatic tire 9 of the first variant form, while at the same time being puncture-proof.

In FIG. 2, it can be seen that the stub axle carrier 13 houses, in its open central part, a stub axle 19 intended to transmit movement to the mounted assembly 1. More specifically, the relative movement between the stub axle 19 and the stub axle carrier 13 is rendered possible by the fact that the stub axle 19 is housed in a hub 21 mounted in the stub axle carrier 13 via rolling bearings 23.

In the setup visible in FIG. 2, it will be appreciated that the suspension system 11 is fitted with the stub axle 19, with the hub 21 and with a braking device 25 (represented as a brake disc in FIG. 2) beforehand. The mounted assembly 1 is then fitted onto the flange 20 of the hub 21 then fixed by collaboration between the fixing holes 6 and the fixing shanks 8.

More specifically, the mounted assembly 1 is offered up to the hub 21 by an operator positioned on the side of the internal surface 2 of the mounting wheel 3. The operator positions the mounted assembly 1 in such a way that the fixing holes 6 face the fixing shanks 8, then tightens the fixing shanks 8 until each of the heads of the fixing shanks 8 is immobilized against the hub 21. Each fixing shank 8 therefore secures the suspension system 11 to the mounted assembly 1 only via mounting from the internal surface 2 of the mounting wheel 3.

Advantageously according to the invention, the mounted assembly 1 thus comprises an external surface 4 of mounting wheel 3 and, in the continuation of that, an external sidewall 30 of the intermediate mass 29, which are very uniform in terms of their geometry. In addition, they are free of any fixing element, or trim intended to hide these fixing elements. The external surface 4 of mounting wheel 3 and, in the continuation of that, the external sidewall 30 of the intermediate mass 29 may thus be manufactured with an even profile, which means to say one without discontinuities. Such an even profile may thus be a completely flat surface which is particularly advantageous from an aerodynamic standpoint, without the addition of additional components. It will be notably appreciated that the external surface 4 may be solid in the region of the centre of the mounting wheel 3, as illustrated in FIG. 2.

As a result, in addition to affording a surface which is free of any fixing element or trim, the mounted assembly 1 is also difficult to steal when mounted on the motor vehicle. This is because changing each assembly 1 requires access from the internal surface 2, and this will dissuade a thief from attempting to remove them. In the example of FIG. 2, the configuration of the stub axle carrier 13 allows access to the fixing shank 8 in order to remove the mounted assembly 1. The mounted assembly 1 needs merely to be turned in order to access each fixing shank 8. Because this second variant form is puncture-proof, it effectively becomes unnecessary to supply a spare wheel and the mounted assembly 1 will be removed only when the tread 5 has reached is maximum tread wear limit, for example for retreading or replacing it.

This second variant form is suited to electric vehicles which might thus be able to have motors mounted on the internal surface 2 of the mounted assemblies 1, in place of the stub axle 19. It is also immediately apparent that the cavities 28 allow the mounted assembly 1 to be lightened without it losing its mechanical properties.

Finally, the space freed up in the centre, namely in the solid part of the external surface 4, may allow the incorporation of elements that could not be mounted because of the presence of the fixing elements 7. By way of entirely nonlimiting example, the centre of the mounting wheel 3 could thus incorporate a contactless signal transmission circuit, a microprocessor or even lighting elements.

Figure 3:
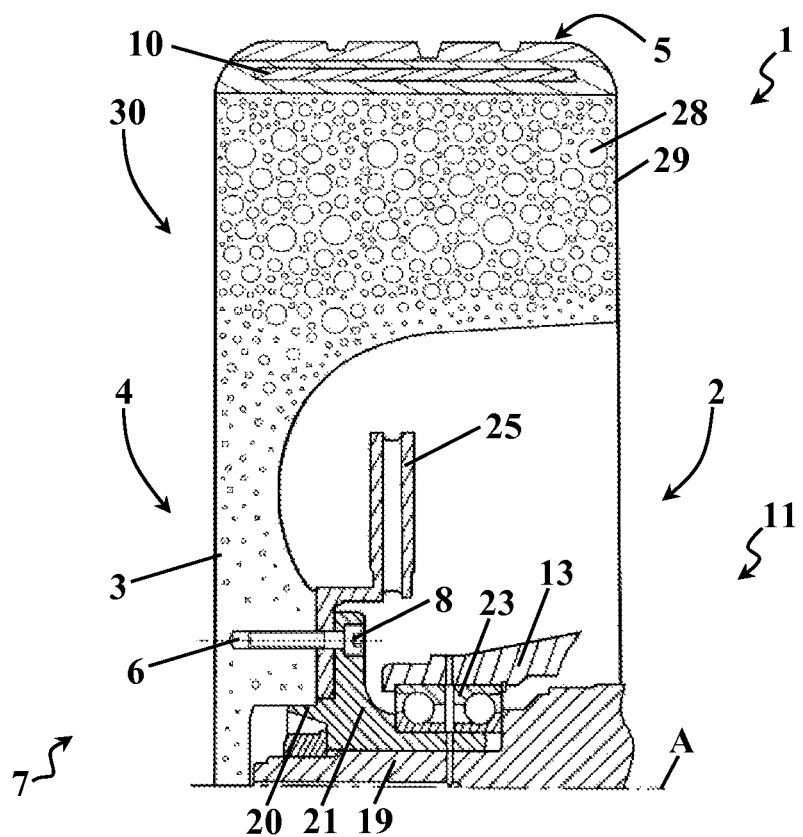
FIG. 3 is a view in cross section of the first embodiment of a mounted assembly connected to a motor vehicle suspension system according to a third variant form of the invention.

As visible in FIG. 3, a third variant form of the first embodiment comprises a tread 5 which is secured to the mounting wheel 3 by an intermediate mass 29 made of polyurethane or of rubber, forming a mounted assembly 1 of composite type. As visible in FIG. 3, the tread 5 may comprise a reinforcer 10 (for example a reinforcing ply) making it possible to ensure good mechanical integrity and/or good stiffness near the contact patch in which it is in contact with the roadway. In addition, the mounting wheel 3 comprises fixing holes 6 uniformly distributed about an axis of rotation A on its internal surface 2.

However, unlike in the second variant form, in the third variant form, the intermediate mass 29 and the mounting wheel 3 are formed together of the same material. As can be seen in FIG. 3, the intermediate mass 29 and the mounting wheel 3 comprise at least a part comprising a plurality of cavities 28. For preference in this third variant form, the cavities 28 are trapped within the intermediate mass 29 and the mounting wheel 3.

In addition, and more preferably still, the material of the intermediate mass 29 and of the mounting wheel 3 comprises more cavities in the vicinity of the tread 5 than in the vicinity of the centre of the mounting wheel 3. It will be appreciated that a stiffness that varies gradually between the centre of the mounting wheel 3 and the peripheral end of the intermediate mass 29 in the vicinity of the tread 5 is desired. One example of a mounted assembly 1 according to the third variant form is depicted in FIGS. 5 to 8.

As can be seen in these figures, in the vicinity of the centre of the mounting wheel 3 there are a few cavities 28, if any, and these intercommunicate little, if at all, whereas, on the other hand, at the peripheral end of the intermediate mass 29 in the vicinity of the tread 5, there are a great many cavities 28, most of which intercommunicate. Thus, as visible in FIG. 8, at least in the vicinity of the tread 5, the density of cavities 28 is such that the intermediate mass 29 comprises beams 27 of various shapes. As a result, the intermediate mass 29 forms a three-dimensional structure comprising a plurality of beams 27. For preference according to the invention, at least in the vicinity of the tread 5, the beams 27 are oriented in such a way as to form a lattice. More preferably still, the lattice forms a structure of the Voronoi diagram type with Delaunay triangulation. In the entirely nonlimiting example of FIGS. 6 and 7, it may be seen that beams 27 extend over a large proportion of the mounted assembly 1.

The mounting wheel 3 therefore affords great stiffness notably in the region of its centre, which is comparable with the mounting wheel 3 of the first and second variant forms, while having an appearance that is uniform to the intermediate mass 29. Finally, the intermediate mass 29 thus makes it possible to afford elasticity and mechanical strength comparable with the pneumatic tire 9 of the first variant form, while at the same time being puncture-proof.

In FIG. 3, it can be seen that the stub axle carrier 13 houses, in its open central part, a stub axle 19 intended to transmit movement to the mounted assembly 1. More specifically, the relative movement between the stub axle 19 and the stub axle carrier 13 is rendered possible by the fact that the stub axle 19 is housed in a hub 21 mounted in the stub axle carrier 13 via rolling bearings 23.

In the setup visible in FIG. 3, it will be appreciated that the suspension system 11 is fitted with the stub axle 19, with the hub 21 and with a braking device 25 (represented as a brake disc in FIG. 3) beforehand. The mounted assembly 1 is then fitted onto the flange 20 of the hub 21 then fixed by collaboration between the fixing holes 6 and the fixing shanks 8.

More specifically, the mounted assembly 1 is offered up to the hub 21 by an operator positioned on the side of the internal surface 2 of the mounting wheel 3. The operator positions the mounted assembly 1 in such a way that the fixing holes 6 face the fixing shanks 8, then tightens the fixing shanks 8 until each of the heads of the fixing shanks 8 is immobilized against the hub 21. Each fixing shank 8 therefore secures the suspension system 11 to the mounted assembly 1 only via mounting from the internal surface 2 of the mounting wheel 3.

Advantageously according to the invention, the mounted assembly 1 thus comprises an external surface 4 of mounting wheel 3 and, in the continuation of that, an external sidewall 30 of the intermediate mass 29, which are very uniform in terms of their geometry, and which give a monolithic appearance. In addition, they are free of any fixing element, or trim intended to hide these fixing elements. The external surface 4 of mounting wheel 3 and, in the continuation of that, the external sidewall 30 of the intermediate mass 29 may thus be manufactured with an even profile, which means to say one without discontinuities. Such an even profile may thus be a completely flat surface which is particularly advantageous from an aerodynamic standpoint, without the addition of additional components. It will be notably appreciated that the external surface 4 may be solid in the region of the centre of the mounting wheel 3, as illustrated in FIG. 3.

As a result, in addition to affording an external surface which is free of any fixing element or trim, the mounted assembly 1 is also difficult to steal when mounted on a motor vehicle. This is because changing each mounted assembly 1 requires access from the internal surface 2, and this will dissuade a thief from attempting to remove them. In the example of FIG. 3, the configuration of the stub axle carrier 13 allows access to the fixing shank 8 in order to remove the mounted assembly 1. The mounted assembly 1 needs merely to be turned in order to access each fixing shank 8. Because this third variant form is puncture-proof, it effectively becomes unnecessary to supply a spare wheel and the mounted assembly 1 will be removed only when the tread 5 has reached is maximum tread wear limit, in order to, for example, retread or replace it.

Furthermore, the space freed up in the centre, namely in the solid part of the external surface 4, may allow the incorporation of elements that could not be mounted because of the presence of the fixing elements 7. By way of entirely nonlimiting example, the centre of the mounting wheel 3 could thus incorporate a contactless signal transmission circuit, a microprocessor or even lighting elements.

This third variant form is particularly suited to electric vehicles which might thus be able to have motors mounted on the internal surface 2 of the mounted assemblies 1, in place of the stub axle 19. It will be appreciated that it can be obtained by additive manufacturing. It is also immediately apparent that the cavities 28 allow the mounted assembly 1 to be lightened without it losing its mechanical properties.

Figure 9:
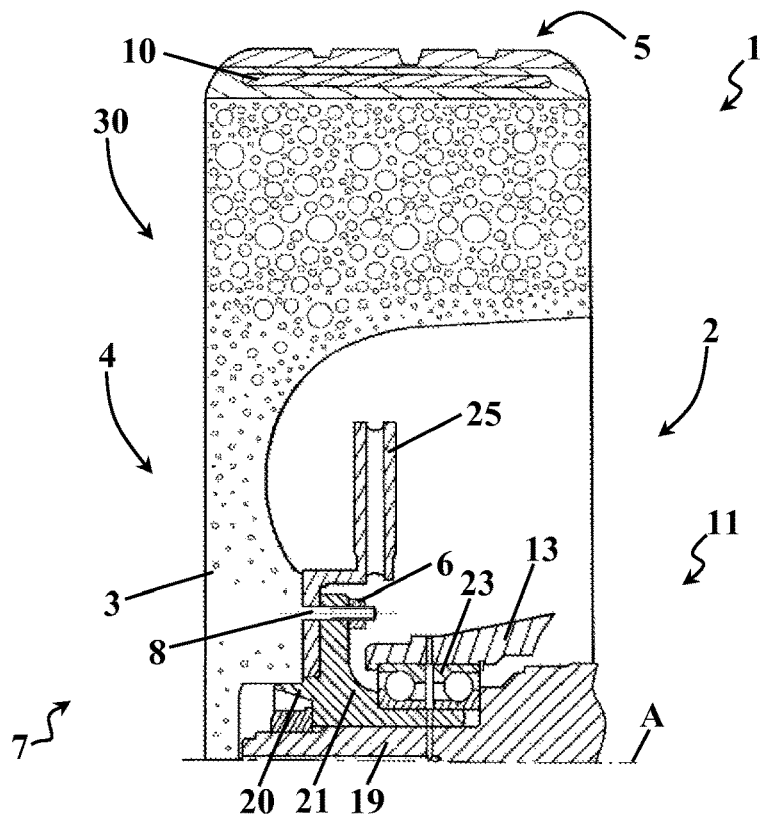
FIG. 9 is a view in cross section of a second embodiment of a mounted assembly connected to a motor vehicle suspension system according to the invention.
Figure 10:
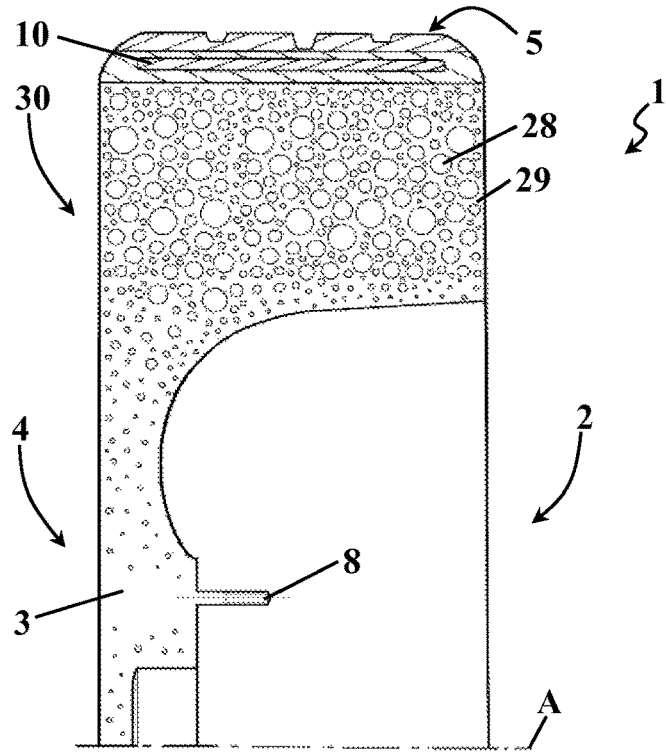
FIG. 10 is a view in cross section of the second embodiment of a mounting wheel according to the invention.

A second embodiment is visible in FIGS. 9 and 10. Unlike in the first embodiment, in the second embodiment, the fixing hole 6 and the fixing shank 8 are interchanged. It is therefore immediately apparent that the three variant forms of the first embodiment can also be applied to the second embodiment, with the same technical effects and advantages. However, the second embodiment is illustrated only in FIGS. 9 and 10 in a variant form similar to the third variant form of the first embodiment.

The mounted assembly 1 according to the second embodiment comprises a tread 5 which is secured to the mounting wheel 3 by an intermediate mass 29 made of polyurethane or of rubber, forming a mounted assembly 1 of composite type. As visible in FIGS. 9 and 10, the tread 5 may comprise a reinforcer 10 (for example a reinforcing ply) making it possible to ensure good mechanical integrity and/or good stiffness near the contact patch in which it is in contact with the roadway. In addition, the mounting wheel 3 comprises fixing shanks 8 uniformly distributed about the axis of rotation A on its internal surface 2.

As in the third variant form of the first embodiment, the intermediate mass 29 and the mounting wheel 3 are formed together of the same material. As can be seen in FIGS. 9 and 10, the intermediate mass 29 and the mounting wheel 3 comprise at least a part comprising a plurality of cavities 28.

In addition, for preference, the material of the intermediate mass 29 and of the mounting wheel 3 comprises more cavities in the vicinity of the tread 5 than in the vicinity of the centre of the mounting wheel 3. It will be appreciated that a stiffness that varies gradually between the centre of the mounting wheel 3 and the peripheral end of the intermediate mass 29 in the vicinity of the tread 5 is desired.

The mounting wheel 3 therefore affords great stiffness notably in the region of its centre, which is comparable with the mounting wheel 3 of the first and second variant forms of the first embodiment, while having an appearance that is uniform to the intermediate mass 29. Finally, the intermediate mass 29 thus makes it possible to afford elasticity and mechanical strength comparable with the pneumatic tire 9 of the first variant form of the first embodiment, while at the same time being puncture-proof.

In FIG. 9, it can be seen that the stub axle carrier 13 houses, in its open central part, a stub axle 19 intended to transmit movement to the mounted assembly 1. More specifically, the relative movement between the stub axle 19 and the stub axle carrier 13 is rendered possible by the fact that the stub axle 19 is housed in a hub 21 mounted in the stub axle carrier 13 via rolling bearings 23.

In the setup visible in FIG. 9, it will be appreciated that the suspension system 11 is fitted with the stub axle 19, with the hub 21 and with a braking device 25 (represented as a brake disc in FIG. 9) beforehand. The mounted assembly 1 is then fitted onto the flange 20 of the hub 21 then fixed by collaboration between the fixing holes 6 and the fixing shanks 8. More specifically, each fixing shank 8 of the mounted assembly 1 forms an at least partially threaded stud intended to collaborate with a fixing hole 6 formed by a nut.

More specifically, the mounted assembly 1 is offered up to the hub 21 by an operator positioned on the side of the internal surface 2 of the mounting wheel 3. The operator positions the mounted assembly 1 in such a way that the fixing shanks 8 face the holes in the hub 21, then tightens the fixing holes 6 until each fixing hole 6 is immobilized against the hub 21. Each fixing hole 6 therefore secures the suspension system 11 to the mounted assembly 1 only via mounting from the internal surface 2 of the mounting wheel 3.

Advantageously according to the invention, the mounted assembly 1 thus comprises an external surface 4 of mounting wheel 3 and, in the continuation of that, an external sidewall 30 of the intermediate mass 29, which are very uniform in terms of their geometry, and which give a monolithic appearance. In addition, they are free of any fixing element, or trim intended to hide these fixing elements. The external surface 4 of mounting wheel 3 and, in the continuation of that, the external sidewall 30 of the intermediate mass 29 may thus be manufactured with an even profile, which means to say one without discontinuities. Such an even profile may thus be a completely flat surface which is particularly advantageous from an aerodynamic standpoint, without the addition of additional components. It will be notably appreciated that the external surface 4 may be solid in the region of the centre of the mounting wheel 3, as illustrated in FIG. 9.

As a result, in addition to affording an external surface which is free of any fixing element or trim, the mounted assembly 1 is also difficult to steal when mounted on a motor vehicle. This is because changing each mounted assembly 1 requires access from the internal surface 2, and this will dissuade a thief from attempting to remove them. In the example of FIG. 9, the configuration of the stub axle carrier 13 allows access to the fixing hole 6 in order to remove the mounted assembly 1. The mounted assembly 1 needs merely to be turned in order to access each fixing hole 6. Because this second embodiment is puncture-proof, it effectively becomes unnecessary to supply a spare wheel and the mounted assembly 1 will be removed only when the tread 5 has reached is maximum tread wear limit, in order to, for example, retread or replace it.

Furthermore, the space freed up in the centre, namely in the solid part of the external surface 4, may allow the incorporation of elements that could not be mounted because of the presence of the fixing elements 7. By way of entirely nonlimiting example, the centre of the mounting wheel 3 could thus incorporate a contactless signal transmission circuit, a microprocessor or even lighting elements.

This second embodiment is particularly suited to electric vehicles which might thus be able to have motors mounted on the internal surface 2 of the mounted assemblies 1, in place of the stub axle 19. It will be appreciated that it can be obtained by additive manufacturing. It is also immediately apparent that the cavities 28 allow the mounted assembly 1 to be lightened without it losing its mechanical properties.

The invention is not limited to the embodiments and variant forms thereof presented and other embodiments and variant forms will be clearly apparent to a person skilled in the art. It is notably possible to use other fixing elements 7 without losing the advantages of the invention.

Entirely nonlimitingly, the fixing elements 7 could, instead or in addition, comprise one part of at least one bayonet-type fixing equipped with a locking element.

In addition, the suspension system 11 and/or the braking device 25 may use different technologies without losing the advantages of the invention. By way of entirely nonlimiting example, the suspension system 11 could be of the trailing-arm type and the braking device 25 of the drum brake type.

Finally, depending on the configuration of the stub axle carrier 13 and, more generally, of the suspension system 11, it may be necessary to create, in the suspension system 11, an opening to provide access to the fixing elements 7 of the mounted assembly 1.

The invention claimed is:

1. Mounting wheel for a motor vehicle comprising an internal surface and an external surface, the internal surface not being visible when the mounting wheel is mounted on the motor vehicle, and at least one fixing element configured to attach the mounting wheel to the motor vehicle, wherein the fixing element is arranged on the internal surface of the mounting wheel in such a way as to leave the external surface of the mounting wheel free of any fixing element so that the fixing element is not visible when the mounting wheel is mounted on the motor vehicle and wherein the external surface does not communicate with the internal surface in a centre of the mounting wheel.

2. The mounting wheel according to claim 1, wherein the fixing element comprises one part of at least one fixing of a fixing hole—fixing shank type.

3. The mounting wheel according to claim 1, wherein the fixing element is a bore formed on the internal surface of the mounting wheel and intended to collaborate with an at least partially threaded screw.

4. The mounting wheel according to claim 2, wherein the fixing hole is formed on the internal surface of the mounting wheel.

5. The mounting wheel according to claim 2, wherein the fixing shank is mounted on the internal surface of the mounting wheel.

6. The mounting wheel according to claim 1, comprising between 3 and 9 fixing elements.

7. The mounting wheel according to claim 6, wherein the fixing elements are uniformly distributed about an axis of rotation of the mounting wheel.

8. A mounted assembly comprising a tread configured to allow the mounted assembly to roll along a roadway, wherein it comprises a mounting wheel according to claim 1.

9. The mounted assembly according to claim 8, wherein the tread is secured to the mounting wheel by a pneumatic tyre.

10. The mounted assembly according to claim 8, wherein the tread is secured to the mounting wheel by an intermediate mass.

11. The mounted assembly according to claim 10, wherein the intermediate mass comprises at least a part made from a material comprising a plurality of cavities.

12. The mounted assembly according to claim 10, wherein the intermediate mass and the mounting wheel are formed together in a same material and comprise at least a part made from a material comprising a plurality of cavities.

13. The mounted assembly according to claim 12, wherein the material comprising a plurality of cavities has more cavities near the tread than near the centre of the mounting wheel.

14. The mounted assembly according to claim 11, wherein the part made in a material comprising a plurality of cavities forms a three-dimensional structure comprising a plurality of beams.

15. The mounted assembly according to claim 14, wherein the beams are oriented in such a way as to form a lattice.

16. The mounted assembly according to claim 15, wherein the lattice forms a structure of a Voronoi diagram type with Delaunay triangulation.

17. The mounted assembly according to claim 11, wherein the material comprising a plurality of cavities is made of polyurethane or of rubber.

18. A motor vehicle comprising a suspension system, and wherein, the fixing element of the mounted assembly of claim 8 is attached to the suspension system.

19. The mounting wheel according to claim 1, wherein the fixing element is an at least partially threaded stud formed on the internal surface of the mounting wheel and intended to collaborate with a nut.

* * * * *

UNITED STATES PATENT AND TRADEMARK OFFICE
CERTIFICATE OF CORRECTION

| | | |
|---|---|---|
| PATENT NO. | : 11,472,225 B2 | Page 1 of 1 |
| APPLICATION NO. | : 16/619734 | |
| DATED | : October 18, 2022 | |
| INVENTOR(S) | : Mostapha El-Oulhani | |

It is certified that error appears in the above-identified patent and that said Letters Patent is hereby corrected as shown below:

On the Title Page

Item (86) should read:
(86)  PCT No.:   PCT/FR2018/051332

§ 371 (c)(1),
(2) Date:   Dec. 5, 2019

Signed and Sealed this
Seventeenth Day of January, 2023

*Katherine Kelly Vidal*

Katherine Kelly Vidal
*Director of the United States Patent and Trademark Office*